United States Patent
Chen et al.

(10) Patent No.: US 8,948,097 B2
(45) Date of Patent: Feb. 3, 2015

(54) UE-RS SEQUENCE INITIALIZATION FOR WIRELESS COMMUNICATION SYSTEMS

(75) Inventors: Wanshi Chen, San Diego, CA (US); Juan Montojo, San Diego, CA (US); Tao Luo, San Diego, CA (US); Alexei Yurievitch Gorokhov, San Diego, CA (US); Aamod Dinkar Khandekar, San Diego, CA (US); Naga Bhushan, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 12/890,182

(22) Filed: Sep. 24, 2010

(65) Prior Publication Data

US 2011/0237267 A1    Sep. 29, 2011

Related U.S. Application Data

(60) Provisional application No. 61/247,491, filed on Sep. 30, 2009, provisional application No. 61/248,830, filed on Oct. 5, 2009.

(51) Int. Cl.
| | |
|---|---|
| *H04W 4/00* | (2009.01) |
| *H04L 5/00* | (2006.01) |
| *H04J 11/00* | (2006.01) |
| *H04J 13/16* | (2011.01) |
| *H04J 13/10* | (2011.01) |
| *H04L 27/26* | (2006.01) |

(52) U.S. Cl.
CPC ............. *H04J 11/003* (2013.01); *H04L 5/0023* (2013.01); *H04J 13/16* (2013.01); *H04J 13/10* (2013.01); *H04J 11/005* (2013.01); *H04L 5/0051* (2013.01); *H04L 27/2613* (2013.01)
USPC ......................................................... 370/329

(58) Field of Classification Search
CPC ...... H04L 1/1861; H04L 5/001; H04L 5/0023; H04L 5/0053; H04L 5/0055
See application file for complete search history.

(56) References Cited

U.S. PATENT DOCUMENTS 5,887,262 A * 3/1999 Willhoff ................... 455/452.1
7,443,875 B2   10/2008 Okuyama
(Continued)

FOREIGN PATENT DOCUMENTS

| CN | 1618195 A | 5/2005 |
|---|---|---|
| CN | 101340228 A | 1/2009 |

(Continued)

OTHER PUBLICATIONS

3GPP TS 36.211 v8.9.0 (Dec. 2009).*

(Continued)

*Primary Examiner* — Yong Zhou
(74) *Attorney, Agent, or Firm* — Liem T. Do

(57) ABSTRACT

Pseudo-random sequences of a plurality of user equipment specific reference signals (UE-RSs) for use by a plurality of user equipments (UEs) are initialized, the initialization of each pseudo-random sequence associated with each UE-RS being independent of a specific UE identifier and independent of a resource bandwidth assigned to a specific UE. Pseudo-random sequences of the UE-RSs are generated. At least one of the pseudo-random sequences is mapped to a portion of common resources for at least one UE among the plurality of UEs.

44 Claims, 8 Drawing Sheets

(56) References Cited

U.S. PATENT DOCUMENTS

| | | | |
|---|---|---|---|
| 7,734,979 | B1 | 6/2010 | Jones et al. |
| 8,369,429 | B2 | 2/2013 | Koo et al. |
| 8,634,362 | B2 | 1/2014 | Montojo et al. |
| 2002/0138721 | A1 | 9/2002 | Kwon et al. |
| 2002/0191562 | A1 | 12/2002 | Kumaki et al. |
| 2003/0169702 | A1 | 9/2003 | Ryu et al. |
| 2005/0018703 | A1 | 1/2005 | Blasco Claret et al. |
| 2009/0132675 | A1 | 5/2009 | Horn et al. |
| 2009/0136034 | A1 | 5/2009 | Gaal et al. |
| 2009/0238064 | A1* | 9/2009 | Lee et al. ............... 370/208 |
| 2010/0041350 | A1 | 2/2010 | Zhang et al. |
| 2010/0062783 | A1 | 3/2010 | Luo et al. |
| 2010/0195599 | A1 | 8/2010 | Zhang et al. |
| 2010/0238877 | A1 | 9/2010 | Nam et al. |
| 2010/0272040 | A1* | 10/2010 | Nam et al. ............... 370/329 |
| 2010/0304682 | A1 | 12/2010 | Choi et al. |
| 2011/0038330 | A1 | 2/2011 | Luo et al. |
| 2011/0077038 | A1 | 3/2011 | Montojo et al. |
| 2011/0085503 | A1* | 4/2011 | Nam et al. ............... 370/329 |
| 2011/0194485 | A1 | 8/2011 | Horneman et al. |
| 2011/0216842 | A1 | 9/2011 | Zhang et al. |
| 2011/0235608 | A1 | 9/2011 | Koo et al. |
| 2011/0243191 | A1 | 10/2011 | Nakao et al. |
| 2011/0249767 | A1 | 10/2011 | Chen et al. |
| 2011/0305287 | A1 | 12/2011 | Kwon et al. |
| 2012/0033643 | A1 | 2/2012 | Noh et al. |
| 2012/0113951 | A1 | 5/2012 | Koo et al. |
| 2012/0120842 | A1 | 5/2012 | Kim et al. |
| 2012/0236741 | A1 | 9/2012 | Xu et al. |
| 2012/0329468 | A1 | 12/2012 | Chmiel et al. |
| 2013/0051371 | A1 | 2/2013 | Ko et al. |
| 2013/0336214 | A1 | 12/2013 | Sayana et al. |
| 2013/0343299 | A1 | 12/2013 | Sayana et al. |
| 2014/0036737 | A1 | 2/2014 | Ekpenyong et al. |
| 2014/0092829 | A1 | 4/2014 | Han et al. |

FOREIGN PATENT DOCUMENTS

| | | |
|---|---|---|
| EP | 2104295 A2 | 9/2009 |
| JP | 2012531082 A | 12/2012 |
| TW | M335885 U | 7/2008 |
| TW | 200929944 A | 7/2009 |
| WO | 2009002251 A3 | 2/2009 |
| WO | 2008152612 A3 | 3/2009 |
| WO | 2010068011 A2 | 6/2010 |
| WO | WO-2010147419 A2 | 12/2010 |
| WO | 2011021154 A1 | 2/2011 |

OTHER PUBLICATIONS

"3rd Generation Partnership Project; Technical Specification Group Radio Access Network; Evolved Universal Terrestrial Radio Access (E-UTRA); Physical Channels and Modulation" (Release 8), 3GPP TS 36.211 V8.9.0, Dec. 2009.

"3rd Generation Partnership Project; Technical Specification Group Radio Access Network; Evolved Universal Terrestrial Radio Access (E-UTRA); Physical layer procedures", (Release 8), 3GPP TS 36.213 V8.8.0, Sep. 2009.

3rd Generation Partnership Project; Technical Specification Group Radio Access Network; Evolved Universal Terrestrial Radio Access (E-UTRA); Physical Channels and Modulation (Release 8) 3GPP Standard; 3GPP TS 36.211, SRD Generation Partnership Project (3GPP), Mobile Competence Centre ; 650, Route Des Lucioles ; F-06921 Sophia-Antipolis Cedex ; France, No. V8.6.0, Mar. 1, 2009, pp. 1-83, XP050377538.

Ericsson: "A discussion on some technology components for LTE-Advanced", 3GPP Draft, R1-082024 {LTE-Advanced Technology Components}, 3RD Generation Partnership Project (3GPP), Mobile Competence Centre, 650, Route Des Lucioles, F-06921 Sophia-Antipolis Cedex, France, vol. RAN WG1, no. Kansas City, USA, May 14, 2008, XP050110365, [retrieved on May 14, 2008].

International Search Report and Written Opinion—PCT/US2010/050906, ISA/EPO—May 12, 2011.

Jungnickel .V, et al., "Implementation concepts for distributed cooperative transmission", Signals, Systems and Computers, 2008 42nd Asilomar Conference on, IEEE, Piscataway, NJ, USA, Oct. 26, 2008, pp. 1035-1039, XP031475445, ISBN: 978-1-4244-2940-0.

Li L, et al., "A Novel Semi-Dynamic Inter-Cell Interference Coordination Scheme Based on User Grouping", Vehicular Technology Conference Fall (VTC 2009-Fall), 2009 IEEE 70th, IEEE, Piscataway, NJ, USA, Sep. 20, 2009, pp. 1-5, XP031600186, ISBN: 978-1-4244-2514-3.

Nokia Siemens Networks et al., Considerations on Initialization and Mapping of DM-RS Sequence, 3GPP Draft, R1-093304, 3rd Generation Partnership Project (3GPP), Mobile Competence Centre , 650, Route Des Lucioles , F-06921 Sophia-Antipolis Cedex , France, no. Shenzhen, China, Aug. 29, 2009, XP050351628.

Nokia Siemens Networks et al., "Scrambling Sequence Initialisation", 3GPP Draft, R1-080940_Scramblinginit, 3rd Generation Partnership Project (3GPP), Mobile Competence Centre, 650, Route Des Lucioles, F-06921 Sophia-Antipolis Cedex, France, vol. RAN WG1, no. Sorrento, Italy, Feb. 5, 2008, XP050109412, [retrieved on Feb. 5, 2008].

Panasonic: "Discussion on PUCCH coordination for UL CoMP", 3GPP Draft; R1-091165, 3rd Generation Partnership Project (3GPP), Mobile Competence Centre ; 650, Route Des Lucioles ; F-06921 Sophia-Antipolis Cedex ; France, no. Seoul, Korea; Mar. 17, 2009, XP050338786, [retrieved on Mar. 17, 2009].

Qualcomm Europe: "DL MU-MIMO operation in LTE-A", 3GPP Draft; R1-094215 LTE-A MU-MIMO, 3rd Generation Partnership Project (3GPP), Mobile Competence Centre ; 650, Route Des Lucioles ; F-06921 Sophia-Antipolis Cedex ; France, no. Miyazaki; Oct. 12, 2009, XP050388684, [retrieved on Oct. 6, 2009].

Qualcomm Europe: "Further Considerations and Link Simulations on Reference Signals in LTE-A", 3GPP Draft, R1-090875, 3rd Generation Partnership Project (3GPP), Mobile Competence Centre, 650, Route Des Lucioles, F-06921 Sophia-Antipolis Cedex, France, no. Athens, Greece, Feb. 4, 2009, XP050318724, [retrieved on Feb. 4, 2009].

Qualcomm Europe: "Specification details for PRS sequences", 3GPP Draft, R1-080466, 3rd Generation Partnership Project (3GPP), Mobile Competence Centre, 650, Route Des Lucioles, F-06921 Sophia-Antipolis Cedex , France, vol. RAN WG1, no. Sevilla, Spain, Jan. 9, 2008, XP050108984, [retrieved on Jan. 9, 2008].

Qualcomm Europe: "UE-RS Patterns for ranks 5 to 8 of LTE-A", 3GPP Draft, R1-094212 UE RS Patterns for Rank 5-8, 3rd Generation Partnership Project (3GPP), Mobile Competence Centre, 650, Route Des Lucioles, F-06921 Sophia-Antipolis Cedex, France, no. Miyazaki, Oct. 12, 2009, XP050388682, [retrieved on Oct. 7, 2009].

Samsung: "Design Considerations for Comp Joint Transmission", 3GPP Draft, R1-091868 Design Considerations for Comp Joint Transmission, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339364, [retrieved on Apr. 28, 2009].

"UE-RS Patterns for Rank 3-4", 3GPP TSG-RAN WG1 #58bis, R1-094211, Oct. 12-16, 2009, pp. 8, Miyazaki, Japan.

Ericsson, ST-Ericsson: "Draft CR 36.211 Introduction of enhanced dual layer transmission", 3GPP TSG-RAN WG1#58b R1-094321 Miyazaki, Japan, 2009.

LTE; Evolved Universal Terrestrial Radio Access (E-UTRA); Physical channels and modulation (3GPP TS 36.211 version 8.7.0 Release 8) Technical Specification, European Telecommunications Standards Institute (ETSI), 650, Route Des Lucioles ; F-06921 Sophia-Antipolis ; France, no. V8.7.0, Jun. 1, 2009, XP01404478.

Philips: "Some RS Design Issues for Dual layer Beamforming", 3GPP Draft, R1-094329, 3rd Generation Partnership Project (3GPP), Mobile Competetence Centre, 650, Route Des Lucioles, F-06921 Sophia-Antipolis Cedex, France, no. Miyazaki, Oct. 12, 2009.

Taiwan Search Report—TW099133333—TIPO—Jun. 27, 2013.

Panasonic, "Discussion on PUCCH Coordination for UL CoMP", 3GPP TSG-RAN WG1 Meeting #56, R1-090687, Feb. 3, 2009 (3GPP TSG-RAN WG1 ftp upload date), pp. 1-2.

* cited by examiner

UE-RS SEQUENCE INITIALIZATION FOR WIRELESS COMMUNICATION SYSTEMS

CROSS-REFERENCE

The present application claims the benefit of U.S. Provisional Patent Application Ser. No. 61/247,491, entitled "UE-RS SEQUENCE INITIALIZATION FOR REL-9 AND BEYOND," filed on Sep. 30, 2009 and U.S. Provisional Patent Application Ser. No. 61/248,830, entitled "UE-RS SEQUENCE INITIALIZATION FOR REL-9 AND BEYOND," filed on Oct. 5, 2009, each of which is hereby incorporated by reference in its entirety.

BACKGROUND

1. Field of the Invention

The present disclosure relates generally to wireless communication, and more specifically for reference signal (RS) sequence initialization for wireless communication systems.

2. Relevant Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink, DL) refers to the communication link from the base stations to the terminals, and the reverse link (or uplink, UL) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In addition, multi-user MIMO (MU-MIMO) systems are provided that allow an access point (or other wireless device) to simultaneously transmit to multiple UEs (or other wireless devices) using MIMO over a single frequency band. In this regard, access points can transmit UE specific reference signals (RS) to the UEs for demodulating data transmitted simultaneously in one or more signals in the frequency band. In LTE Release 8 (Rel-8) for single-layer beamforming, UE RS sequences are defined in terms of bandwidth of one or more resource blocks of a corresponding downlink transmission. In addition, pseudo-random sequences for the UE RS are generated according to a UE-specific identifier.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with assigning and initializing sequences of UE-RSs in MU-MIMO configurations.

In certain aspects, a method of data communication in a wireless communication system is provided. The method can comprise initializing pseudo-random sequences of a plurality of user equipment specific reference signals (UE-RSs) for use by a plurality of user equipments (UEs), the initialization of each pseudo-random sequence associated with each UE-RS being independent of a specific UE identifier and independent of a resource bandwidth assigned to a specific UE. The method can further comprise generating pseudo-random sequences of the UE-RSs. The method can further comprise mapping at least one of the pseudo-random sequences to a portion of common resources for at least one UE among the plurality of UEs.

In certain aspects, a method of data communication in a wireless communication system is provided. The method can comprise receiving at least one pseudo-random sequence of a user equipment specific reference signal (UE-RS), the at least one pseudo-random sequence having been initialized independent of a specific UE identifier and independent of a resource bandwidth assigned to a specific UE. The method can further comprise receiving data on a downlink bandwidth resource. The method can further comprise using the UE-RS to decode data received on the downlink bandwidth resource.

In certain aspects, an apparatus in a wireless communication network is provided. The apparatus can comprise at least one processor configured to initialize pseudo-random sequences of a plurality of user equipment specific reference signals (UE-RSs) for use by a plurality of user equipments (UEs), the initialization of each pseudo-random sequence associated with each UE-RS being independent of a specific UE identifier and independent of a resource bandwidth assigned to a specific UE; generate pseudo-random sequences of the UE-RSs; and map at least one of the pseudo-random sequences to a portion of common resources for at least one UE among the plurality of UEs. The apparatus can further comprise a memory coupled to the at least one processor.

In certain aspects, an apparatus in a wireless communication system is provided. The apparatus can comprise at least one processor configured to receive at least one pseudo-random sequence of a user equipment specific reference signal (UE-RS), the at least one pseudo-random sequence having been initialized independent of a specific UE identifier and independent of a resource bandwidth assigned to the UE; receive data on a downlink bandwidth resource; and use the UE-RS to decode data received on the downlink bandwidth resource. The apparatus can further comprise a memory coupled to the at least one processor.

In certain aspects, an apparatus in a wireless communication network is provided. The apparatus can comprise means for initializing pseudo-random sequences of a plurality of user equipment specific reference signals (UE-RSs) for use by a plurality of user equipments (UEs), the initialization of each pseudo-random sequence associated with each UE-RS being independent of a specific UE identifier and independent of a resource bandwidth assigned to a specific UE. The apparatus can further comprise means for generating pseudo-random sequences of the UE-RSs. The apparatus can further comprise means for mapping at least one of the pseudo-random sequences to a portion of common resources for at least one UE among the plurality of UEs.

In certain aspects, an apparatus in a wireless communication system is provided. The apparatus can comprise means for receiving at least one pseudo-random sequence of a user equipment specific reference signal (UE-RS), the at least one pseudo-random sequence having been initialized independent of a specific UE identifier and independent of a resource bandwidth assigned to the UE. The apparatus can further comprise means for receiving data on a downlink bandwidth resource. The apparatus can further comprise means for using the UE-RS to decode data received on the downlink bandwidth resource.

In certain aspects, a computer-readable medium having computer readable instructions stored thereon for execution by at least one processor to perform a method is provided. The method can comprise initializing pseudo-random sequences of a plurality of user equipment specific reference signals (UE-RSs) for use by a plurality of user equipments (UEs), the initialization of each pseudo-random sequence associated with each UE-RS being independent of a specific UE identifier and independent of a resource bandwidth assigned to a specific UE. The method can further comprise generating pseudo-random sequences of the UE-RSs. The method can further comprise mapping at least one of the pseudo-random sequences to a portion of common resources for at least one UE among the plurality of UEs.

In certain aspects, a computer-readable medium having computer readable instructions stored thereon for execution by at least one processor to perform a method is provided. The method can comprise receiving at least one pseudo-random sequence of a user equipment specific reference signal (UE-RS), the at least one pseudo-random sequence having been initialized independent of a specific UE identifier and independent of a resource bandwidth assigned to the UE. The method can further comprise receiving data on a downlink bandwidth resource. The method can further comprise using the UE-RS to decode data received on the downlink bandwidth resource.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain illustrative aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
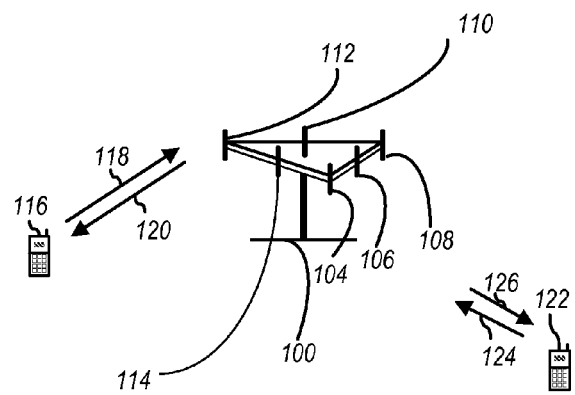
FIG. 1 is a diagram illustrating a multiple access wireless communication system.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, evolved Node B (eNB), or some other terminology. An access terminal may also be called an access terminal, user equipment (UE), a wireless communication device, terminal, access terminal or some other terminology. Moreover, an access point may be a macrocell access point, femtocell access point, picocell access point, and/or the like.

Additionally, as described, access point 100 can communicate with access terminals 116 and 122 using MIMO, single-user MIMO (SU-MIMO), multi-user MIMO (MU-MIMO), and/or the like. In this regard, access point 100 can transmit reference signals (RSs) to the access terminals 116 and 122 that can be used for demodulating subsequent signals sent from the access point 100. In an example, the RSs can be UE specific. In one example, RSs for access terminals 116 and 122 (and/or additional access terminals communicating with access point 100) can be CDM, FDM, and/or a combination of CDM and FDM to facilitate diversity.

Figure 2:
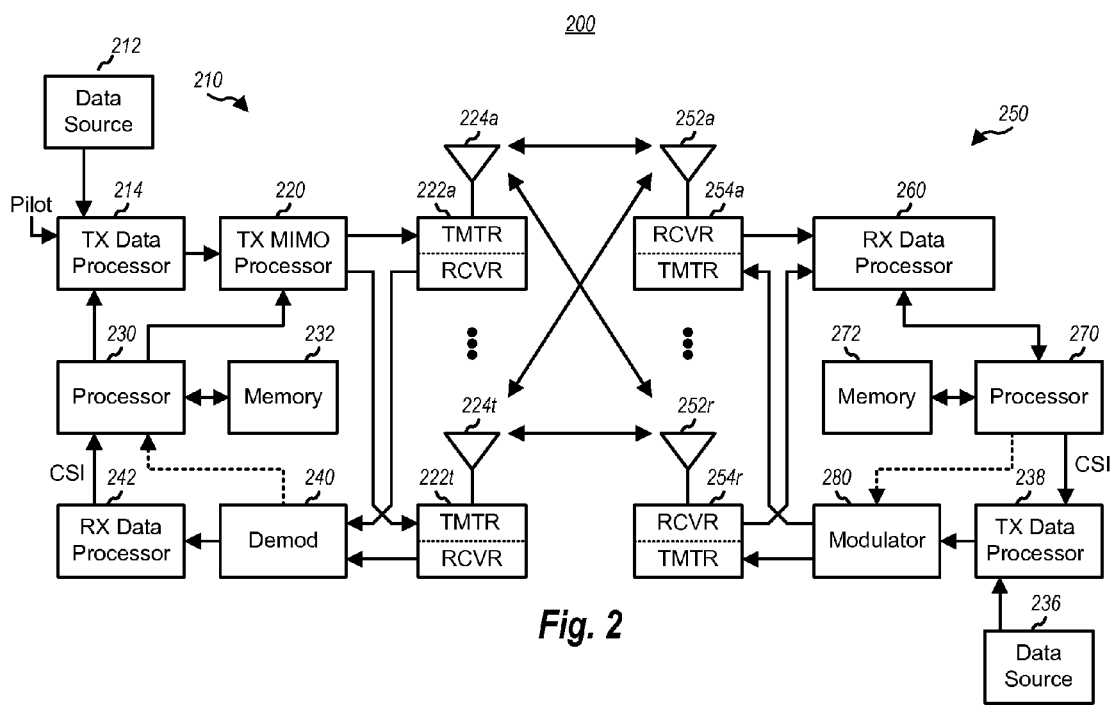
FIG. 2 is a block diagram illustrating a communication system.

FIG. 2 is a block diagram of an embodiment of a transmitter system 210 (can be an access point or access terminal) and a receiver system 250 (can be an access terminal or access point) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MBMS Traffic Channels (MTCHs). Generally, after establishing a Radio Resource Control (RRC) connection this channel is only used by UEs that receive MBMS (Note: old MCCH+ MSCH). Dedicated Control Channel (DCCH) is a point-to-point bi-directional channel that transmits dedicated control information and is used by UEs having an RRC connection. In aspect, Logical Traffic Channels comprises a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into downlink (DL) and uplink (UL). DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprise: Physical Downlink Shared Channel (PDSCH), Physical Broadcast Channel (PBSH), Physical Multicast Channel (PMCH), Physical Downlink Control Channel (PDCCH), Physical Hybrid Automatic Repeat Request Indicator Channel (PHICH), and Physical Control Format Indicator Channel (PCFICH).

The UL PHY Channels comprise: Physical Random Access Channel (PRACH), Physical Uplink Shared Channel (PUSCH), and Physical Uplink Control Channel (PUCCH).

In an aspect, a channel structure is provided that preserves low PAR (at any given time, the channel is contiguous or uniformly spaced in frequency) properties of a single carrier waveform.

Figure 3:
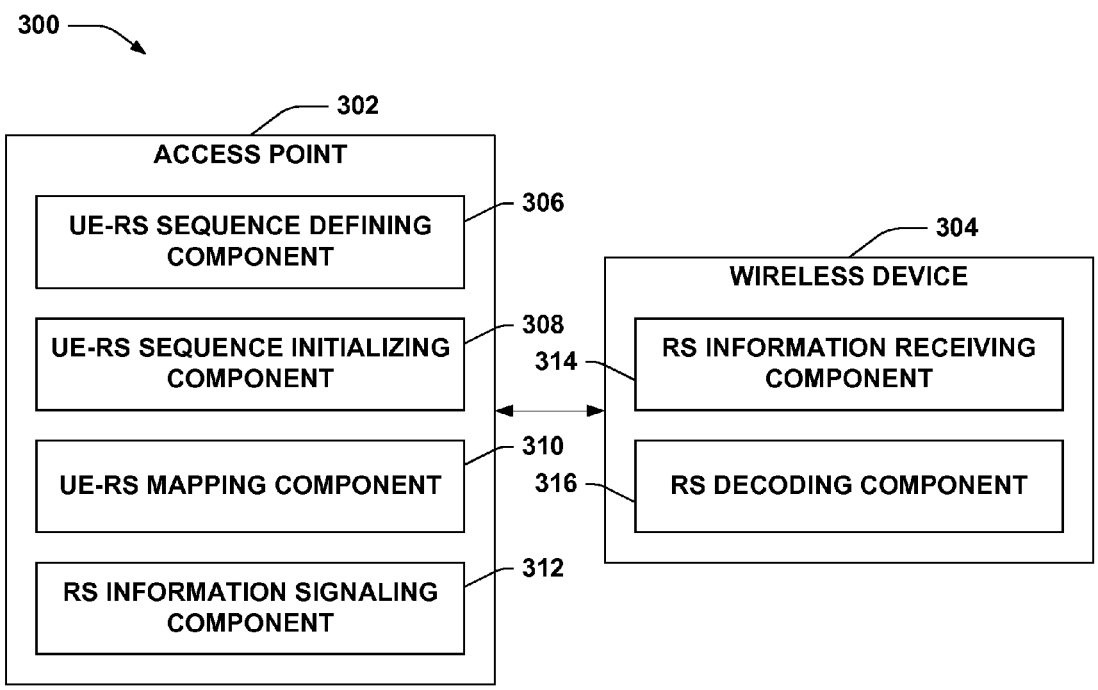
FIG. 3 is a block diagram illustrating an exemplary system that facilitates defining, initializing and mapping reference signals (RSs) in MU-MIMO configurations.

For the purposes of the present document, the following abbreviations apply:
 ACK Acknowledgement
 AM Acknowledged Mode
 AMD Acknowledged Mode Data
 ARQ Automatic Repeat Request
 BCCH Broadcast Control CHannel
 BCH Broadcast CHannel
 C- Control-
 CCE Control Channel Element
 CCCH Common Control CHannel
 CCH Control CHannel
 CCTrCH Coded Composite Transport Channel
 CDM Code Division Multiplexing
 CP Cyclic Prefix
 CQI Channel Quality Indicator
 CRC Cyclic Redundancy Check
 CRS Common Reference Signal
 CTCH Common Traffic CHannel
 DCCH Dedicated Control CHannel
 DCH Dedicated CHannel
 DCI Downlink Control Information
 DL DownLink
 DRS Dedicated Reference Signal
 DSCH Downlink Shared CHannel
 DTCH Dedicated Traffic CHannel
 E-CID Enhanced Cell IDentification
 FACH Forward link Access CHannel
 FDD Frequency Division Duplex
 FSTD Frequency Switched Transmit Diversity
 HARQ Hybrid Automatic Repeat/reQuest
 L1 Layer 1 (physical layer)
 L2 Layer 2 (data link layer)
 L3 Layer 3 (network layer)
 LI Length Indicator
 LLR Log-Likelihood Ratio
 LSB Least Significant Bit
 MAC Medium Access Control
 MBMS Multimedia Broadcast Multicast Service
 MCCH MBMS point-to-multipoint Control CHannel
 MRW Move Receiving Window
 MSB Most Significant Bit
 MSCH MBMS point-to-multipoint Scheduling CHannel
 MTCH MBMS point-to-multipoint Traffic CHannel
 NACK Non-Acknowledgement
 PCCH Paging Control CHannel
 PCH Paging CHannel
 PDCCH Physical Downlink Control CHannel
 PDU Protocol Data Unit
 PHY PHYsical layer
 PhyCH Physical CHannels
 PMI Precoding Matrix Indicator
 PRACH Physical Random Access CHannel
 PUCCH Physical Uplink Control CHannel
 RACH Random Access CHannel
 RB Resource Block
 RLC Radio Link Control
 RRC Radio Resource Control
 RE Resource Element
 RS Reference Signal
 RTT Round Trip Time
 Rx Receive
 SAP Service Access Point
 SDU Service Data Unit
 SFBC Space Frequency Block Code
 SHCCH SHared channel Control CHannel
 SN Sequence Number
 SUFI SUper FIeld
 TA Timing Advance
 TCH Traffic CHannel
 TDD Time Division Duplex
 TFI Transport Format Indicator
 TM Transparent Mode
 TMD Transparent Mode Data
 TTI Transmission Time Interval
 Tx Transmit
 U- User-
 UE User Equipment
 UL UpLink
 UM Unacknowledged Mode
 UMD Unacknowledged Mode Data
 UMTS Universal Mobile Telecommunications System
 UTRA UMTS Terrestrial Radio Access
 UTRAN UMTS Terrestrial Radio Access Network
 MBSFN multicast broadcast single frequency network
 MCE MBMS coordinating entity
 MCH multicast channel
 DL-SCH downlink shared channel
 MSCH MBMS control channel
 PDCCH physical downlink control channel
 PDSCH physical downlink shared channel FIG. 3 illustrates an exemplary system 300 that facilitates generating UE-RSs and related resource mappings in an MU- MIMO configuration. System 300 includes an access point 302 that can be a base station, femtocell access point, picocell access point, relay node, mobile base station, mobile device operating in a peer-to-peer communications mode, and/or the like, for example, that provides wireless device 304 with access to a wireless network. Wireless device 304 can be a user equipment (UE) such as a mobile device, portion thereof, or substantially any device that can access a wireless network.

Access point 302 can include a UE-RS sequence defining component 306 that develops a plurality of reference signals that can be used by one or more UEs to decode data over shared resources, a UE-RS sequence initializing component 308 that creates a pseudo-random sequence of the reference signals for the one or more UEs, a UE-RS mapping component 310 that maps a UE to a given pseudo-random sequence of UE-RSs, and an RS information signaling component 312 that communicates the UE-RS mapping information to a corresponding UE. Wireless device 304 can include an RS information receiving component 314 that obtains one or more parameters related to RS transmissions from an access point and an RS decoding component 316 that decodes one or more RSs based at least in part on the parameters.

According to an example, as described, RSs in an MU-MIMO configuration can be CDM, FDM, and/or a combination thereof. For example, where RSs are CDM, access point 302 can multiplex RSs according to pseudo-random sequences selected for one or more wireless devices. In an example, UE-RS sequence defining component 306 can generate a plurality of UE-RSs that can be utilized to decode data sent over shared resources to one or more UEs. In MU-MIMO configurations, it is to be appreciated that devices having shared bandwidth assignments and/or location assignments may not be completely aligned. Thus, UE-RS sequence defining component 306 can generate the plurality of UE-RSs based on an entire bandwidth of a related cell instead of based on PDSCH bandwidth (as in LTE release 8). In another aspect (e.g., to support multi-cell MU-MIMO), UE-RS sequence defining component 306 can generate the UE-RSs in a bandwidth agnostic manner, such as according to a largest downlink bandwidth configuration in terms of resource block (RBs).

Once the UE-RSs are defined, UE-RS sequence initializing component 308 can generate pseudo-random sequences of the UE-RS for assigning to UEs to decode shared resources. In MU-MIMO configurations, it can be desirable that antenna ports for wireless devices paired to use the same PDSCH resources remain orthogonal. To this end, UE-RS sequence initializing component 308 can initialize the UE-RS sequences based at least in part on a cell identifier (as opposed to a UE identifier in LTE release 8). This can ensure orthogonality since the antenna ports use the common metric. In this regard, for example, other common metrics can be utilized, such as resource block identifier, antenna port index, and/or the like, that can be known for both antenna ports. The UE-RS mapping component 310 can assign the pseudo-random sequences of UE-RS and shared resources to one or more wireless devices using a pre-determined mapping scheme that maintains the orthogonality (e.g., sequentially from one end of the band, starting from the center of the band, etc.).

In FIG. 3, RS information signaling component 312 can signal pseudo-random sequences of RS, related resources, and/or related parameters corresponding to the wireless device 304. At wireless device 304, RS information receiving component 314 can obtain the received pseudo-random sequences of RS, related shared resources, and/or parameters from the access point 302. RS decoding component 316 can decode RSs specific to wireless device 304 from access point 302 over the shared resources using the pseudo-random sequences, for example.

In some communication systems, UE-specific reference signal (UE-RS) is specified to support single-layer beamforming. For example, in DL transmission mode 7 of LTE Rel-8, the UE-RS sequence r (m) is defined by:

$$r(m) = \frac{1}{\sqrt{2}}(1 - 2 \cdot c(2m)) + j\frac{1}{\sqrt{2}}(1 - 2 \cdot c(2m+1)), \quad (1)$$
$$m = 0, 1, \ldots, 12N_{RB}^{PDSCH} - 1$$

where $N_{RB}^{PDSCH}$ denotes the bandwidth in resource blocks of the corresponding PDSCH transmission. The pseudo-random sequence c(i) can be pre-defined. The pseudo-random sequence generator can be initialized with:

$$c_{init} = (\lfloor n_s/2 \rfloor + 1) \cdot (2N_{ID}^{cell} + 1) \cdot 2^{16} + n_{RNTI} \quad (2)$$

at the start of each subframe where $n_{RNTI}$ is defined, and can be a UE-specific ID.

In other communication systems, dual-stream beamforming relying on two UE-RS antenna ports is supported. For example, in LTE Rel-9, the following can be true:
1) The two antenna ports are CDM-ed.
2) Dynamic rank adaptation is supported: that is, a UE may be indicated either rank 1 or rank 2 DL transmissions using layer 2 signaling (PDCCH). In case of rank 1 transmission, the UE is explicitly indicated which antenna port should be used.
3) MU-MIMO is supported: that is, two UEs may be paired using the same PDSCH resources. Each UE is indicated the antenna port in use, but is not indicated whether it is in the MU- or SU-MIMO transmission.

For MU-MIMO operation, it is advantageous that the two UE-RS antenna ports for the paired UEs remain orthogonal after resource mapping using the pseudo-random sequence and the assigned PDSCH resources. However, as can be seen from equation (1) above, if the sequence is initialized based on a UE specific ID, the sequences generated for the paired UEs are no longer the same. As a result, the orthogonality may not be maintained. In addition, one UE does not know the pseudo-random sequence used by the other paired UE, as the UE-IDs may not be mutually known between the paired UEs. Such non-orthogonality and unknown information about the other random sequence can cause significant interference on UE-RS.

Figure 4:
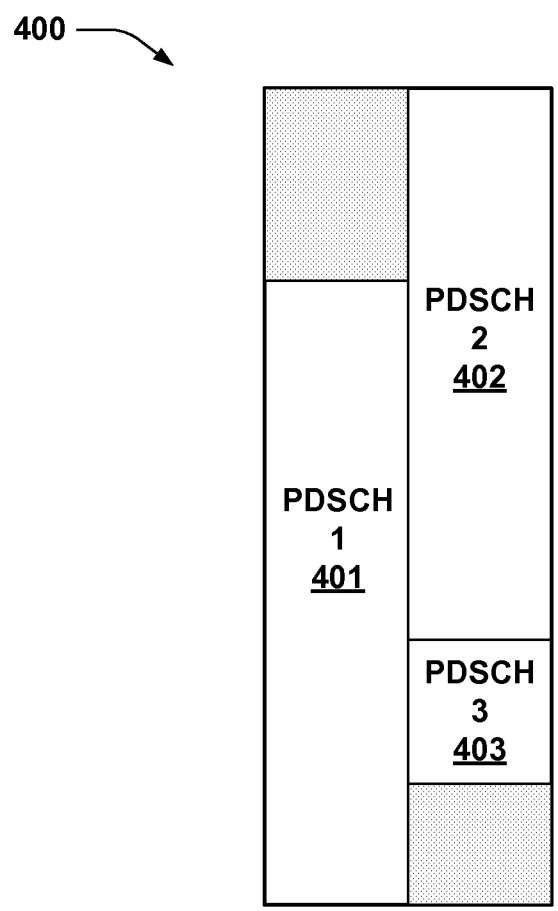
FIG. 4 is a block diagram illustrating PUSCH assignments for various user equipments (UEs) in MU-MIMO configurations.

Another issue is that when the random sequence is generated dependent on the assigned PDSCH bandwidth ($N_{RB}^{PDSCH}$) and mapped to the specific locations of the assigned PDSCH resources, e.g., in (1). It is possible that UEs paired in MU-MIMO transmissions may not be completely aligned, both in terms of the assigned bandwidth and the assigned location, as illustrated in FIG. 4. Turning to FIG. 4, shown is a first PDSCH 401 which is assigned to a first UE and a second PDSCH 402 which is assigned to a second UE that is paired with the first UE. It is clear that the PDSCH bandwidths associated with the first and second PDSCHs 401, 402 are not aligned. In such a case, the pseudo-random sequences for the paired UEs may not be orthogonal.

In view of the aforementioned issues, various UE-RS sequence initialization schemes are employed, in which the initialization of each pseudo-random (PR) sequence associated with each UE-RS is independent of a specific UE identifier and independent of a resource bandwidth assigned to a specific UE.

In one aspect, the UE-RS sequence initialization can be made independent of a UE identifier in a number of different ways. In certain embodiments, this can be achieved by simply removing the UE identifier from the initialization. That is, $$c_{init} = (\lfloor n_s/2 \rfloor + 1) \cdot (2N_{ID}^{cell} + 1) \cdot 2^{16}$$

The initialization is hence independent from UE specific IDs. Generally speaking, one can have:

$$c_{init} = f(N_{ID}^{cell}, \lfloor n_s/2 \rfloor) \qquad (3)$$

The sequence is still cell-dependent and subframe-dependent. Consequently, inter-cell interference randomization can still be realized.

In some embodiments, the UE-RS sequence initialization can be made independent of a specific UE identifier by making the initialization as a function of a resource block identifier ($RB_{ID}$) and/or an antenna port index (AntPortIdx), expressed, respectively, as:

$$c_{init} = f(N_{ID}^{cell}, \lfloor n_s/2 \rfloor, RB_{ID}), \text{ and}$$

$$c_{init} = f(N_{ID}^{cell}, \lfloor n_s/2 \rfloor, AntPortIdx)$$

Although orthogonality may not be maintained for some of the cases, at least the sequence is known to the UEs paired in the MU-MIMO transmissions. The $RB_{ID}$ can be generated either sequentially, or following a specific sequence-to-resource mapping approach (e.g., numbering starting from the middle and increase upwards/downwards, similar to that of the common reference signal (CRS) case).

In some embodiments, the UE-RS sequence initialization can be a function of a cyclic prefix (CP) type (i.e., normal or extended cyclic prefix). For example, the function can be expressed as:

$$c_{init} = f(N_{ID}^{cell}, \lfloor n_s/2 \rfloor, N_{CP}), \text{ where } N_{cp} = \begin{cases} 1 & \text{for normal } CP \\ 0 & \text{for extended } CP \end{cases}$$

In certain embodiments, different combinations of the above dependencies may be employed. For example, the UE-RS sequence initialization can be a function of 1) $RB_{ID}$ and AntPortIdx, 2) $RB_{ID}$ and $N_{CP}$, 3) AntPortIdx and $N_{CP}$, or 4) $RB_{ID}$ and AntPortIdx and $N_{CP}$, etc.

In another aspect, the UE-RS random sequence generation can be done such that the paired UEs still have orthogonal UE-RS sequences, regardless of PDSCH resource allocations. This can be achieved, for example, by making the UE-RS sequence generation independent of a resource bandwidth assigned to a specific UE. This way, dependency on resource bandwidth is removed, thereby mitigating the need for related UEs to be aligned when receiving UE-RS sequences and related resource assignments. In certain embodiments, the UE-RS sequence generation is based on a maximum possible bandwidth of a given cell, and mapped to the DL resources in some pre-determined manner (e.g., sequentially from one end of the band, or starting from the center of the band, etc.). In other words, m=0, 1, . . . , $12N_{RB}^{DL}-1$, where m is defined in equation (1) above, and $N_{RB}^{DL}$ denotes a DL bandwidth of a specific cell in the wireless communication system.

In light of the possible support of multi-cell MU-MIMO, and the fact that the common reference signal (CRS) is generated in a bandwidth agnostic manner in LTE Rel-8, the UE-RS sequence can be bandwidth-agnostic as well. That is, m=0, 1, . . . , $12N_{RB}^{[DL,max]}-1$, where $N_{RB}^{[DL, max]}$ (may also be referred to as $N_{RB}^{[max, DL]}$) is a maximum DL bandwidth configuration in terms of number of RBs, e.g., 110 RBs. The mapping of the generated UE-RS sequence to the UE-RS resources can be the same as CRS (e.g., starting from the center, and mapping downwards/upwards such that the mapping from the generated sequence to the band is bandwidth-agnostic). To be more specific, the mapped symbol $a_{k,l}^{(p)}$ (where k is freq index; l is symbol index; and p is antenna port index) can be similar to: $a_{k,l}^{(p)} = r_{l,n_s}(m')$, where $m' = m + N_{RB}^{max,DL} - N_{RB}^{DL}$, and k has a step size of 6 resource elements (vs. 12 resource elements or the RB size). Thus, m' ranges from $N_{RB}^{[max,DL]} - N_{RB}^{DL}$ to $N_{RB}^{[max,DL]} + N_{RB}^{DL} - 1$. Note that UE-RS can be mapped on a per RB basis, instead of per 6 RBs as in the CRS case.

Figure 5:
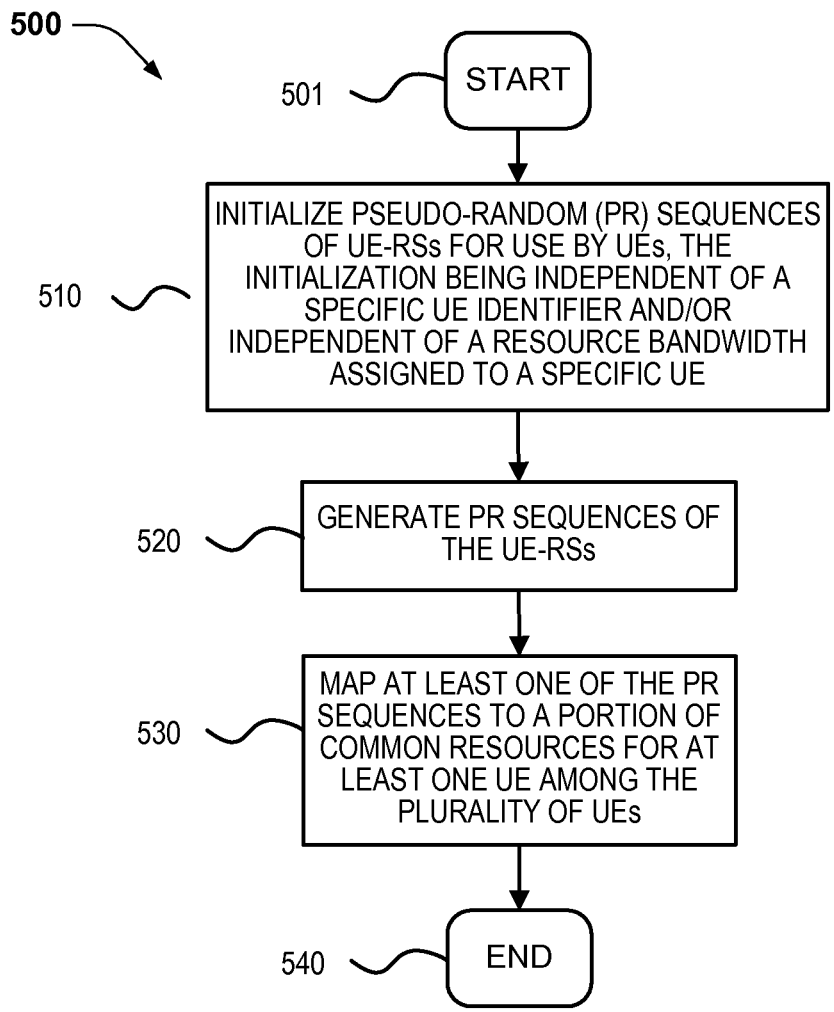
FIG. 5 is a flowchart illustrating an exemplary process for assigning and initializing sequences of UE-RSs in MU-MIMO configurations from a viewpoint of an access point.

FIG. 5 is a flowchart illustrating an exemplary process 500 for assigning and initializing sequences of UE-RSs in MU-MIMO configurations from a viewpoint of an access point (e.g., eNB). The process 500 begins at start state 501 and proceeds to operation 510 in which pseudo-random (PR) sequences of UE-RSs for use by a plurality of UEs are initialized, where the initialization of each PR sequence associated with each UE-RS is independent of a specific UE identifier and/or independent of a resource bandwidth assigned to a specific UE.

As described above, the first independence relating to the UE-RS PR sequence initialization can be achieved by removing the UE identifier from the initialization such as the one defined by equation (3) above; and/or by making the initialization a function of non-UE specific parameter such as $RB_{ID}$, AntPortIdx, $RB_{ID}$, $N_{CP}$, or any combinations thereof. The second independence relating to the resource bandwidth can be achieved by initializing a plurality of UE-RSs based at least in part on a bandwidth of a specific cell that includes the plurality of UE-RSs. As described above, this removes dependency on resource bandwidth associated with the particular UE, which mitigates the need for related UEs to be aligned when receiving UE-RS sequences and related resource assignments.

The process 500 proceeds to operation 520 in which UE-RS PR sequences are generated using a procedure defined by equation (1), for example. The PR sequences can be generated using common (non-UE specific) identifiers, such as a cell identifier ($N_{ID}^{cell}$), resource block identifier ($RB_{ID}$), etc., so cell antennas can retain orthogonality of sequence assignment for devices having similar assigned resources.

The process 500 proceeds to operation 530 in which at least one of the UE-RS PR sequences thus generated is mapped to a portion of common resources for at least one UE among the plurality of UEs. This can be performed using a known or pre-determined pattern to likewise ensure necessary orthogonality. The process 500 then terminates at end state 504.

After the mapping operation 530, an eNB sends the mapped UE-RS PR sequences to a plurality of UEs in a cell. A particular UE among the plurality of UEs can receive the PR sequences, extract a UE-RS intended for the particular UE, and use the UE-RS for data decoding purposes.

Figure 6:
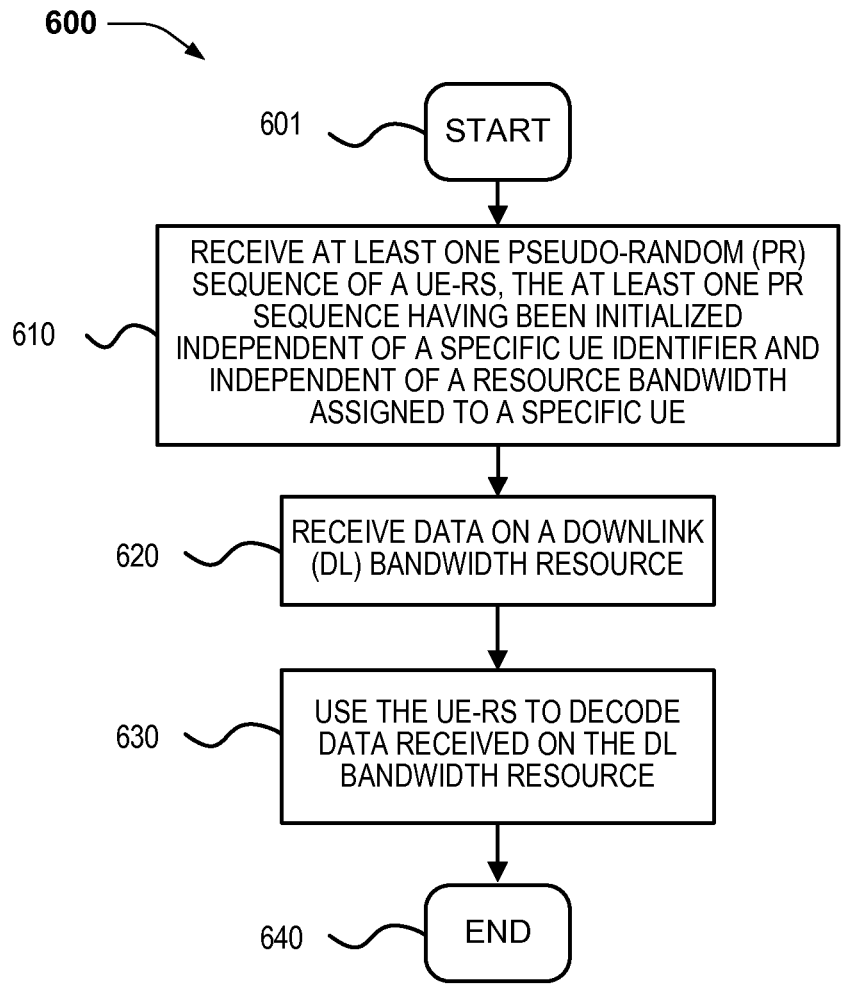
FIG. 6 is a flowchart illustrating an exemplary process for receiving and using sequences of UE-RSs in MU-MIMO configurations from a viewpoint of a user equipment (UE).

FIG. 6 is a flowchart illustrating an exemplary process 600 for receiving and using PR sequences of UE-RSs in MU-MIMO configurations from a viewpoint of a user equipment (UE). The process 600 begins at start state 601 and proceeds to operation 610 in which at least one PR sequence of a UE-RS is received by the UE where the at least one PR sequence has been initialized independent of a specific UE identifier and/or independent of a resource bandwidth assigned to a specific UE.

The process 600 proceeds to operation 620 in which data is received by the UE on a downlink (DL) bandwidth resource (e.g., PDSCH). The process 600 proceeds to operation 630 in which data received on the downlink bandwidth resource is decoded by the UE using the UE-RS. The process 600 terminates at end state 640.

In certain embodiments, as an extension of the embodiments described above, it is possible to apply a group-based UE-RS scrambling and PR sequence initialization. In such an embodiment, UEs are assigned to different groups in a semi-static or in a dynamic way and, within each group, a particular one of various UE-independent UE-RS scrambling and sequence initialization procedures described above can be applied.

In one aspect, a group index indicative of a particular group to which a specific UE is assigned can be conveyed to the UE through L3 or L2 layer signaling, for example. As an example, if there are two groups, the group indices can be defined as 0 and 1. A UE can be informed which group index, 0 or 1, the UE belongs to. Group-based UE-RS sequence initialization allows for non-orthogonal MU-MIMO UE-RS multiplexing when the total number of the layers for co-scheduled UEs in MU-MIMO setup is beyond the number of UE-RS orthogonal ports. For example, in the context of LTE Rel. 9, one can consider two groups of scrambling sequences, say group A and group B. It is possible to orthogonally multiplex 2 UEs of group A (or group B), each receiving rank 1. In addition it is possible to multiplex 2 UEs, each of rank 2, one from group A and one from group B, or 4 UEs each of rank 1 transmission where 2 are from group A and 2 are from group B.

Note that in this case the UEs can benefit from potential optimization of MU interference estimation within the group that the UE is semi-statically or dynamically assigned to. Also, inter-group interference randomization can be realized this way. Optimizations in designing the UE-RS scrambling for each group to reduce the adverse impact across different groups can also be employed.

In one aspect, an eNB can assign each UE to a particular one of different groups based on one or more predetermined factors. For example, an assignment of a particular UE to a particular group can be based on a total number of currently active UEs in each group and/or on one or more UE parameters or attributes of the particular UE. For instance in a correlated antenna deployment, where the channel directionality is changing slowly with time, UEs can be grouped based on their dominant channel directions such that UEs in different groups have dominant channel directions that are apart from, or possibly orthogonal to, each other.

Figure 7:
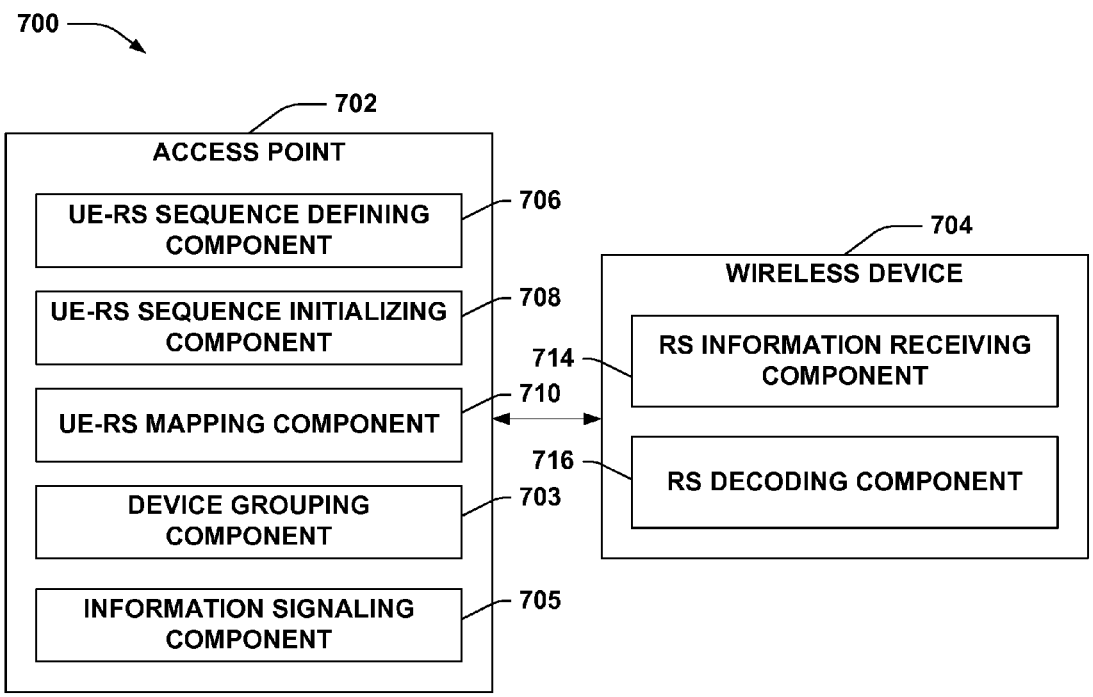
FIG. 7 is a block diagram illustrating an exemplary system that facilitates defining, initializing and mapping RSs in MU-MIMO configurations.

FIG. 7 is a block diagram depicting a system 700 that facilitates generating UE-RSs and related resource mappings in an MU-MIMO configuration. The system 700 includes an access point 702 that can be a base station, femtocell access point, picocell access point, relay node, mobile base station, mobile device operating in a peer-to-peer communications mode, and/or the like, for example, that provides a wireless device 704 with access to a wireless network. The wireless device 704 can be a user equipment (UE) such as a mobile device, portion thereof, or substantially any user equipment (UE) that can receive access to a wireless network.

The access point 702 can include a UE-RS sequence defining component 706 that develops a plurality of reference signals that can be used by one or more UEs to decode data over shared resources, a UE-RS sequence initializing component 708 that creates a pseudo-random sequence of the reference signals for the one or more UEs, a UE-RS mapping component 710 that maps a UE to a given pseudo-random sequence of UE-RSs, a device grouping component 703 that assigns UEs to which resources are assigned to one or more groups, and an information signaling component 705 that communicates the UE-RS mapping and/or grouping information to one or more corresponding UEs. The wireless device 704 can include an RS information receiving component 714 that obtains one or more parameters related to RS transmissions from an access point and an RS decoding component 716 that decodes one or more RSs based at least in part on the parameters.

According to an example, as described above, RSs in an MU-MIMO configuration can be CDM, FDM, and/or a combination thereof. For example, where RSs are CDM, the access point 702 can multiplex RSs according to pseudo random sequences selected for one or more wireless devices. In an example, the UE-RS sequence defining component 706 can generate a plurality of UE-RSs that can be utilized to decode data sent over shared resources to one or more UEs. In MU-MIMO configurations, it is to be appreciated that devices having shared bandwidth assignments and/or location assignments may not be completely aligned. Thus, UE-RS sequence defining component 706 can generate the plurality of UE-RSs based on an entire bandwidth of a related cell instead of based on PDSCH bandwidth (as in LTE release 8). In another example (e.g., to support multi-cell MU-MIMO), the UE-RS sequence defining component 706 can generate the UE-RSs in a bandwidth agnostic manner, such as according to a maximum possible downlink bandwidth configuration in terms of RBs.

Once the UE-RSs are defined, the UE-RS sequence initializing component 708 can generate pseudo-random sequences of the UE-RS for assigning to UEs to decode shared resources. In MU-MIMO configurations, it can be desirable that antenna ports for wireless devices paired to use the same PDSCH resources remain orthogonal. To this end, the UE-RS sequence initializing component 708 can initialize the UE-RS sequences based at least in part on a cell identifier (as opposed to a UE identifier in LTE Rel-8). This can ensure orthogonality since the antenna ports use the common metric. In this regard, for example, other common metrics can be utilized, such as resource block identifier, antenna port index, and/or the like, that can be known for both antenna ports. The UE-RS mapping component 710 can assign the pseudo-random sequences of UE-RS and shared resources to one or more wireless devices using a pre-determined mapping scheme that maintains the orthogonality (e.g., sequentially from one end of the band, starting from the center of the band, etc.).

The device grouping component 703 can assign wireless device (UE) 704 to one or more groups (e.g., randomly, or based on a number of active UEs in a group, parameters of the device, and/or the like, as discussed above). In this regard, UE-RS sequence initializing component 708 can initialize the UE-RS sequences for the wireless device 704 based on the assigned group. Using group-based sequence initialization, in one example, can ensure orthogonality among devices depending on a received rank. For example, if there are two UE-RS ports, where the device grouping component 703 assigns the wireless device 704 to a group and the wireless device 704 receives rank 1, the UE-RS sequence initializing component 708 can initialize orthogonal sequences for the wireless device 704 and another device in the same group receiving rank 1. Similarly, where the device grouping component 703 assigns the wireless device 704 to a group and the wireless device 704 receives rank 2, the UE-RS sequence initializing component 708 can initialize orthogonal sequences for the wireless device 704 and another device in a separate group receiving rank 2.

The information signaling component 705 can signal pseudo-random sequences, related resources, and/or related parameters corresponding to the wireless device 704. At wireless device (UE) 704, the RS information receiving component 714 can obtain the pseudo-random sequences, related shared resources, and/or parameters from the access point 702. The RS decoding component 716 can decode RSs specific to the wireless device 704 from the access point 702 over the shared resources using the pseudo-random sequences, for example. Similarly, in one example, the information signaling component 404 of access point 702 can transmit grouping information to the wireless device 704 (e.g., using L3 layer signaling).

Figure 8:
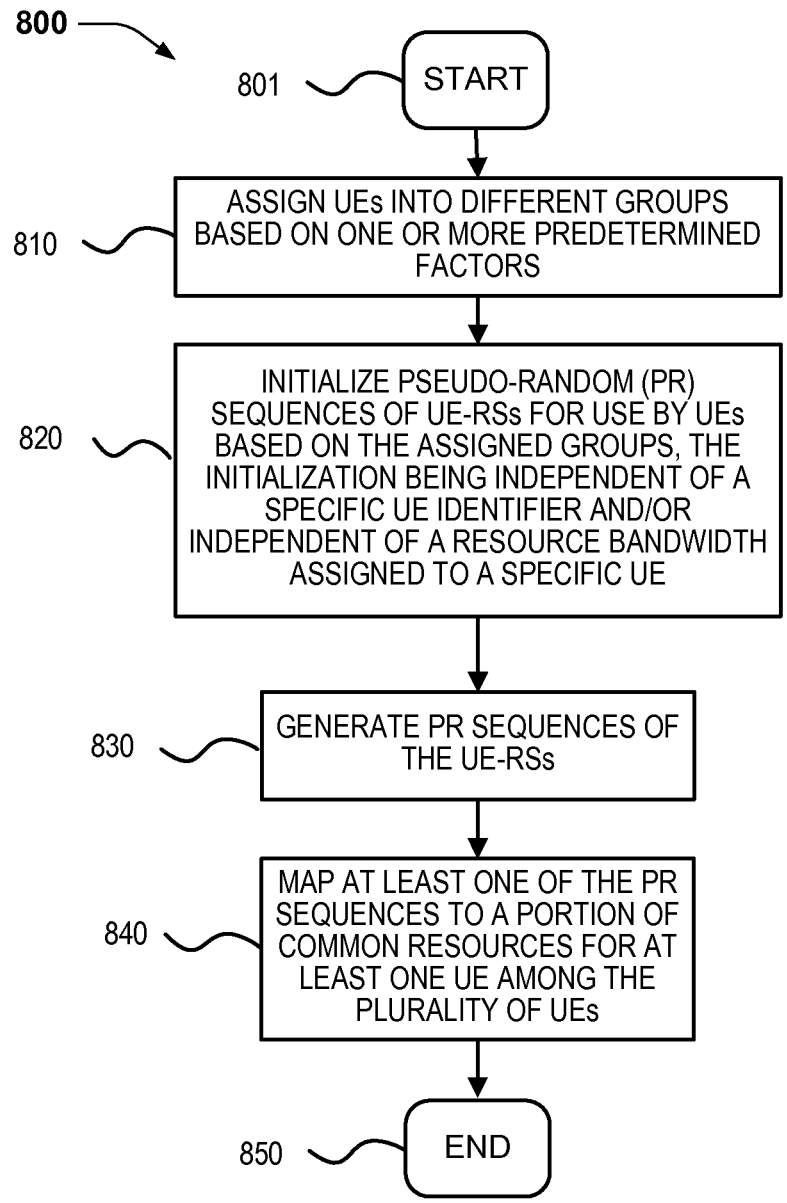
FIG. 8 is a flowchart illustrating an exemplary process for assigning and initializing sequences of UE-RSs in MU-MIMO configurations from a viewpoint of an access point.

FIG. 8 is a flowchart illustrating an exemplary process 800 for assigning and initializing sequences of UE-RSs in MU-MIMO configurations from a viewpoint of an access point (e.g., eNB). The process 800 begins at start state 801 and proceeds to operation 810 in which a plurality of UEs are assigned to different UE groups based on one or more predetermined factors. As described above, the predetermined factors can include, but are not limited to, a total number of currently active UEs in each UE group, dominant channel directions of UEs and/or locations of UEs within a cell.

The process 800 proceeds to operation 820 in which pseudo-random (PR) sequences of UE-RSs for use by a plurality of UEs are initialized based on the assigned UE groups. In particular, the initialization of each PR sequence associated with each UE-RS for a particular UE can be based on a group ID indicative of the UE group to which the particular UE has been assigned. By way of example, in the initializing operation 820, $c_{init}$ is an initial value of a pseudo-random sequence generator associated with each UE-RS and is a function defined by $c_{init}=f(N_{ID}^{cell}, \lfloor n_s/2 \rfloor, n\_groupID)$ wherein:

$N_{ID}^{cell}$ is a cell ID, $n_s$ is a slot number, and n_groupID is a group ID.

Furthermore, in some embodiments, in the initializing operation 820, the initialization of each PR sequence associated with each UE-RS is independent of a specific UE identifier and/or independent of a resource bandwidth assigned to a specific UE. As discussed above, the first independence relating to the UE-RS PR sequence initialization can be achieved by removing the UE identifier from the initialization such as the one defined by equation (3) above; and/or by making the initialization a function of non-UE specific attributes such as $RB_{ID}$, AntPortIdx, $RB_{ID}$, $N_{CP}$, or any combinations thereof. The second independence relating to the resource bandwidth can be achieved by initializing a plurality of UE-RSs based at least in part on a bandwidth of a specific cell that includes the plurality of UE-RSs. As described above, this removes dependency on the resource bandwidth associated with the particular UE, which mitigates the need for related UEs to be aligned when receiving UE-RS sequences and related resource assignments.

The process 800 proceeds to operation 830 in which PR sequences of the UE-RSs are generated using a procedure defined by equation (1), for example. The PR sequences can be generated using common (non-UE specific) identifiers, such as a cell identifier ($N_{ID}^{cell}$), a resource block identifier ($RB_{ID}$), a group ID (n_groupID), etc., so cell antennas can retain orthogonality of sequence assignment for devices having similar assigned resources.

The process 800 proceeds to operation 840 in which at least one of the UE-RS PR sequences thus generated is mapped to a portion of common resources for at least one UE among the plurality of UEs. This can be performed using a known or pre-determined pattern to likewise ensure necessary orthogonality. The process 800 terminates at end state 850.

Figure 9:
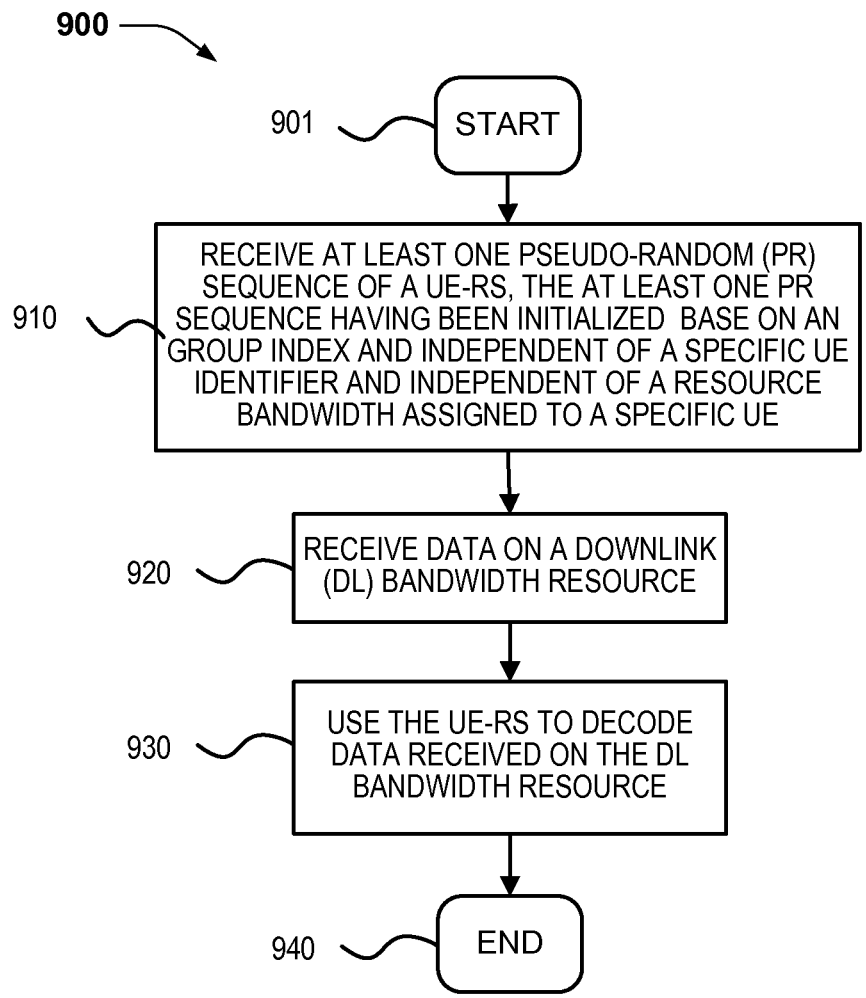
FIG. 9 is a flowchart illustrating an exemplary process for receiving and using sequences of UE-RSs in MU-MIMO configurations from a viewpoint of a user equipment (UE).

FIG. 9 is a flowchart illustrating an exemplary process 900 for receiving and using sequences of UE-RSs in MU-MIMO configurations from a viewpoint of a user equipment (UE). The process 900 begins at start state 901 and proceeds to operation 910 in which at least one PR sequence of a UE-RS is received by a UE where the at least one PR sequence has been initialized based on a group index indicative of a UE group to which the UE belongs. Furthermore, in certain embodiments, the PR sequence has been initialized independent of a specific UE identifier and/or independent of a resource bandwidth (PDSCH) assigned to a specific UE.

The process 900 proceeds to operation 920 in which data is received by the UE on a downlink (DL) bandwidth resource (e.g., PDSCH). The process 900 proceeds to operation 930 in which data received by the UE on the downlink bandwidth resource is decoded by the UE using the received UE-RS. The process 900 terminates at end state 940.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method of data communication in a wireless communication system, comprising:
   initializing a plurality of pseudo-random sequences, each pseudo-random sequence of the plurality of pseudo-random sequences corresponding to a user equipment specific reference signal (UE-RS) for use by at least one user equipment (UE) from a plurality of UEs, the initialization of each pseudo-random sequence being independent of a specific UE identifier and independent of a resource bandwidth assigned to a specific UE, and the initialization being based at least in part on a group ID corresponding to a UE group to which the at least one UE is assigned;
   generating the plurality of pseudo-random sequences; and
   mapping at least one of the plurality of pseudo-random sequences to a portion of common resources for at least one UE among the plurality of UEs.

2. The method of claim 1, wherein in the initializing step, $c_{init}$ is an initial value of a pseudo-random sequence generator associated with the each UE-RS and is a function defined by $c_{init}=f(N_{ID}^{cell},\lfloor n_s/2 \rfloor)$, wherein $N_{ID}^{cell}$ is a cell ID and $n_s$ is a slot number.

3. The method of claim 1, wherein the initialization is based at least in part on a maximum bandwidth configuration of the wireless communication system.

4. The method of claim 1, wherein the pseudo-random sequences are defined by $$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 12N_{RB}^{[DL,max]} - 1,$$

wherein c is a pseudo-random sequence generator, and $N_{RB}^{[DL, max]}$ denote a maximum downlink bandwidth configuration of the wireless communication system.

5. The method of claim 4, wherein $N_{RB}^{[DL, max]}$ is 110 resource blocks (RBs).

6. The method of claim 1, wherein the initialization is based at least in part on an identifier indicative of a resource block (RB).

7. The method of claim 6, wherein in the initializing step, $c_{init}$ is an initial value of a pseudo-random sequence generator associated with the each UE-RS and is a function defined by $c_{init}=f(N_{ID}^{cell}, \lfloor n_s/2 \rfloor, RB_{ID})$, wherein:
$N_{ID}^{cell}$ is a cell ID,
$n_s$ is a slot number, and
$RB_{ID}$ is a resource block (RB) identifier.

8. The method of claim 1, wherein the initialization is based at least in part on an index indicative of an antenna port.

9. The method of claim 8, wherein in the initialization step, $c_{init}$ is an initial value of a pseudo-random sequence generator associated with the each UE-RS and is a function defined by $c_{init}=f(N_{ID}^{cell}, \lfloor n_s/2 \rfloor, AntPortIdx)$, wherein:
$N_{ID}^{cell}$ is a cell ID,
$n_s$ is a slot number, and
AntPortIdx is an antenna port index.

10. The method of claim 1, wherein in the initializing step, $c_{init}$ is an initial value of a pseudo-random sequence generator associated with the each UE-RS and is a function defined by $c_{init}=f(N_{ID}^{cell}, \lfloor n_s/2, n\_groupID)$, wherein:
$N_{ID}^{cell}$ is a cell ID,
$n_s$ is a slot number, and
n_groupID is the group ID.

11. The method of claim 10, wherein there are two groups, a first one of the two groups having n_groupID=0, and a second one of the two groups having n_groupID=1.

12. The method of claim 1, further comprising assigning the group ID in a semi-static manner.

13. The method of claim 1, further comprising assigning the group ID in a dynamic manner.

14. The method of claim 1, wherein the at least one UE is assigned to the UE group based on one of a UE location, a UE dominant channel direction and a total number of current UEs assigned to the UE group.

15. A method of data communication in a wireless communication system, comprising:
receiving at least one pseudo-random sequence from a plurality of pseudo-random sequences, each pseudo-random sequence of the plurality of pseudo-random sequences corresponding to a of a plurality of user equipment specific reference signal (UE-RS) for use by at least one user equipment (UE), each pseudo-random sequence having been initialized independent of a specific UE identifier and independent of a resource bandwidth assigned to a specific UE, and each pseudo-random sequence having been initialized based at least in part on a group ID corresponding to a UE group to which the at least one UE is assigned;

receiving data on a downlink bandwidth resource; and
using the UE-RS to decode data received on the downlink bandwidth resource.

16. The method of claim 15, wherein the at least one pseudo-random sequence is based at least in part on a maximum bandwidth configuration of the wireless communication system.

17. The method of claim 15, wherein the at least one pseudo-random sequence has been initialized based at least in part on an identifier indicative of a resource block (RB).

18. The method of claim 15, wherein the at least one pseudo-random sequence has been initialized based at least in part on an index indicative of an antenna port.

19. An apparatus in a wireless communication network, comprising:
at least one processor configured to:
initialize a plurality of pseudo-random sequences, each pseudo-random sequence of the plurality of pseudo-random sequences corresponding to a user equipment specific reference signal (UE-RS) for use by at least one user equipment (UE) from a plurality of UEs, the initialization of each pseudo-random sequence being independent of a specific UE identifier and independent of a resource bandwidth assigned to a specific UE, and the initialization being based at least in part on a group ID corresponding to a UE group to which the at least one UE is assigned,
generate the plurality of pseudo-random sequences, and
map at least one of the plurality of pseudo-random sequences to a portion of common resources for at least one UE among the plurality of UEs.

20. The apparatus of claim 19, wherein in the initialization of each pseudo-random sequence, $c_{init}$ is an initial value of a pseudo-random sequence generator associated with the each UE-RS and is a function defined by $c_{init}=f(N_{ID}^{cell}, \lfloor n_s/2 \rfloor)$, wherein $N_{ID}^{cell}$ is a cell ID and $n_s$ is a slot number.

21. The apparatus of claim 19, wherein the initialization is based at least in part on a maximum bandwidth configuration of the wireless communication system.

22. The apparatus of claim 19, wherein the pseudo-random sequences are defined by $$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 12N_{RB}^{[DL,max]} - 1,$$

wherein c is a pseudo-random sequence generator, and $N_{RB}^{[DL, max]}$ denotes a maximum downlink bandwidth configuration of the wireless communication system.

23. The apparatus of claim 19, wherein the initialization is based at least in part on an identifier indicative of a resource block (RB).

24. The apparatus of claim 19, wherein the initialization is based at least in part on an index indicative of an antenna port.

25. The apparatus of claim 19, wherein the at least one processor is further configured to assign the group ID in a semi-static manner or a dynamic manner.

26. An apparatus in a wireless communication system, comprising:
at least one processor configured to:
receive at least one pseudo-random sequence from a plurality of pseudo-random sequences, each pseudo-random sequence of the plurality of pseudo-random sequences corresponding to a user equipment specific reference signal (UE-RS) for use by at least one user equipment (UE), each pseudo-random sequence having been initialized independent of a specific UE identifier and independent of a resource bandwidth assigned to a specific UE, and each pseudo-random sequence having been initialized based at least in part on a group ID corresponding to a UE group to which the at least one UE is assigned, receive data on a downlink bandwidth resource, and use the UE-RS to decode data received on the downlink bandwidth resource.

27. The apparatus of claim 26, wherein the at least one pseudo-random sequence is based at least in part on a maximum bandwidth configuration of the wireless communication system.

28. The apparatus of claim 26, wherein the at least one pseudo-random sequence has been initialized based at least in part on an identifier indicative of a resource block (RB).

29. The apparatus of claim 26, wherein the at least one pseudo-random sequence has been initialized based at least in part on an index indicative of an antenna port.

30. An apparatus in a wireless communication network, comprising:

means for initializing a plurality of pseudo-random sequences, each pseudo-random sequence of the plurality of pseudo-random sequences corresponding to a user equipment specific reference signal (UE-RS) for use by a at least one user equipment (UE) from a plurality of UEs, the initialization of each pseudo-random sequence being independent of a specific UE identifier and independent of a resource bandwidth assigned to a specific UE, and the initialization being based at least in part on a group ID corresponding to a UE group to which the at least one UE is assigned;

means for generating the plurality of pseudo-random sequences of the UE-RSs; and means for mapping at least one of the plurality of pseudo-random sequences to a portion of common resources for at least one UE among the plurality of UEs.

31. The apparatus of claim 30, wherein in the initialization of each pseudo-random sequence, $c_{init}$ is an initial value of a pseudo-random sequence generator associated with the each UE-RS and is a function defined by $c_{init}=f(N_{ID}^{cell}, \lfloor n_s/2 \rfloor)$, wherein $N_{ID}^{cell}$ is a cell ID and $n_s$ is a slot number.

32. The apparatus of claim 30, wherein the initialization is based at least in part on a maximum bandwidth configuration of the wireless communication system.

33. The apparatus of claim 30, wherein the pseudo-random sequences are defined by $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 12N_{RB}^{[DL, max]} - 1,$$

wherein c is a pseudo-random sequence generator, and $N_{RB}^{[DL, max]}$ denotes a maximum downlink bandwidth configuration of the wireless communication system.

34. The apparatus of claim 30, wherein the initialization of based at least in part on an identifier indicative of a resource block (RB).

35. The apparatus of claim 30, wherein the initialization is based at least in part on an index indicative of an antenna port.

36. The apparatus of claim 30, further comprising means for assigning the group ID in a semi-static manner or a dynamic manner.

37. An apparatus in a wireless communication system, comprising:

means for receiving at least one pseudo-random sequence from a plurality of pseudo-random sequences, each pseudo-random sequence of the plurality of pseudo-random sequences corresponding to a user equipment specific reference signal (UE-RS) for use by at least one user equipment (UE), each pseudo-random sequence having been initialized independent of a specific UE identifier and independent of a resource bandwidth assigned to a specific UE, and each pseudo-random sequence having been initialized based at least in part on a group ID corresponding to a UE group to which the at least one UE is assigned;

means for receiving data on a downlink bandwidth resource; and means for using the UE-RS to decode data received on the downlink bandwidth resource.

38. The apparatus of claim 37, wherein the at least one pseudo-random sequence is based at least in part on a maximum bandwidth configuration of the wireless communication system.

39. The apparatus of claim 37, wherein the at least one pseudo-random sequence has been initialized based at least in part on an identifier indicative of a resource block (RB).

40. The apparatus of claim 37, wherein the at least one pseudo-random sequence has been initialized based on an index indicative of an antenna port.

41. A computer program product for wireless communications, the computer program product comprising:

a non-transitory computer-readable medium having program code recorded thereon, the program code comprising:

program code to initialize a plurality of pseudo-random sequences, each pseudo-random sequence of the plurality of pseudo-random sequences corresponding to a user equipment specific reference signal (UE-RS) for use by a at least one user equipment (UE) from a plurality of UEs, the initialization of each pseudo-random sequence being independent of a specific UE identifier and independent of a resource bandwidth assigned to a specific UE, and the initialization being based at least in part on a group ID corresponding to a UE group to which the at least one UE is assigned;

program code to generate pseudo-random sequences of the UE-RSs; and program code to map at least one of the pseudo-random sequences to a portion of common resources for at least one UE among the plurality of UEs.

42. The computer program product of claim 41, wherein the pseudo-random sequences are based at least in part on a maximum bandwidth configuration of the wireless communication system.

43. A computer program product for wireless communications, the computer program product comprising:

a non-transitory computer-readable medium having program code recorded thereon, the program code comprising:

program code to receive at least one pseudo-random sequence from a plurality of pseudo-random sequences, each pseudo-random sequence of the plurality of pseudo-random sequences corresponding to a user equipment specific reference signal (UE-RS) for use by at least one user equipment (UE), each pseudo-random sequence having been initialized independent of a specific UE identifier and independent of a resource bandwidth assigned to a specific UE, and each pseudo-random sequence having been initialized based at least in part on a group ID corresponding to a UE group to which the at least one UE is assigned;

program code to receive data on a downlink bandwidth resource; and program code to use the UE-RS to decode data received on the downlink bandwidth resource.

44. The computer program product of claim 43, wherein the at least one pseudo-random sequence is based at least in part on a maximum bandwidth configuration of the wireless communication system.

* * * * *